United States Patent [19]
Elkins

[11] 3,929,354
[45] Dec. 30, 1975

[54] ADJUSTABLE DRAWBAR

[76] Inventor: Edward John Elkins, 3568 Halifax Way, Concord, Calif. 94520

[22] Filed: Dec. 19, 1974

[21] Appl. No.: 534,320

[52] U.S. Cl. .............................. 280/490 R; 280/501
[51] Int. Cl.² ............................................ B60D 1/06
[58] Field of Search ............ 280/488, 490 R, 491 R, 280/491 B, 500, 501, 502, 505, 478 R, 477

[56] References Cited
UNITED STATES PATENTS

| | | | |
|---|---|---|---|
| 2,529,686 | 11/1950 | Green | 280/502 |
| 2,693,369 | 11/1954 | Gross | 280/502 |
| 3,061,333 | 10/1962 | Sudeikis | 280/490 R |
| 3,170,717 | 2/1965 | Hellenga | 280/490 R |

*Primary Examiner*—Robert R. Song
*Attorney, Agent, or Firm*—Townsend and Townsend

[57] ABSTRACT

A trailer hitch is disclosed having a hitch frame attachable to a towing vehicle. The hitch frame includes an exposed arcuate mounting surface. A drawbar is provided as part of the hitch and has an arcuate portion contiguous to a linear trailer mounting portion. The arcuate portion has an inner arcuate surface conformed to the arcuate mounting surface of the hitch frame and is adapted to partially circumscribe that mounting surface. Apparatus are provided for mounting the arcuate portion of the drawbar to the mounting surface of the hitch frame, allowing for adjustment of the circumferential position of the drawbar with respect to the hitch frame. In this manner the drawbar can be adjusted until the trailer mounting portion thereof is horizontal to minimize the likelihood of damage to the trailer hitch or the towing vehicle due to misalignment of the drawbar.

6 Claims, 4 Drawing Figures

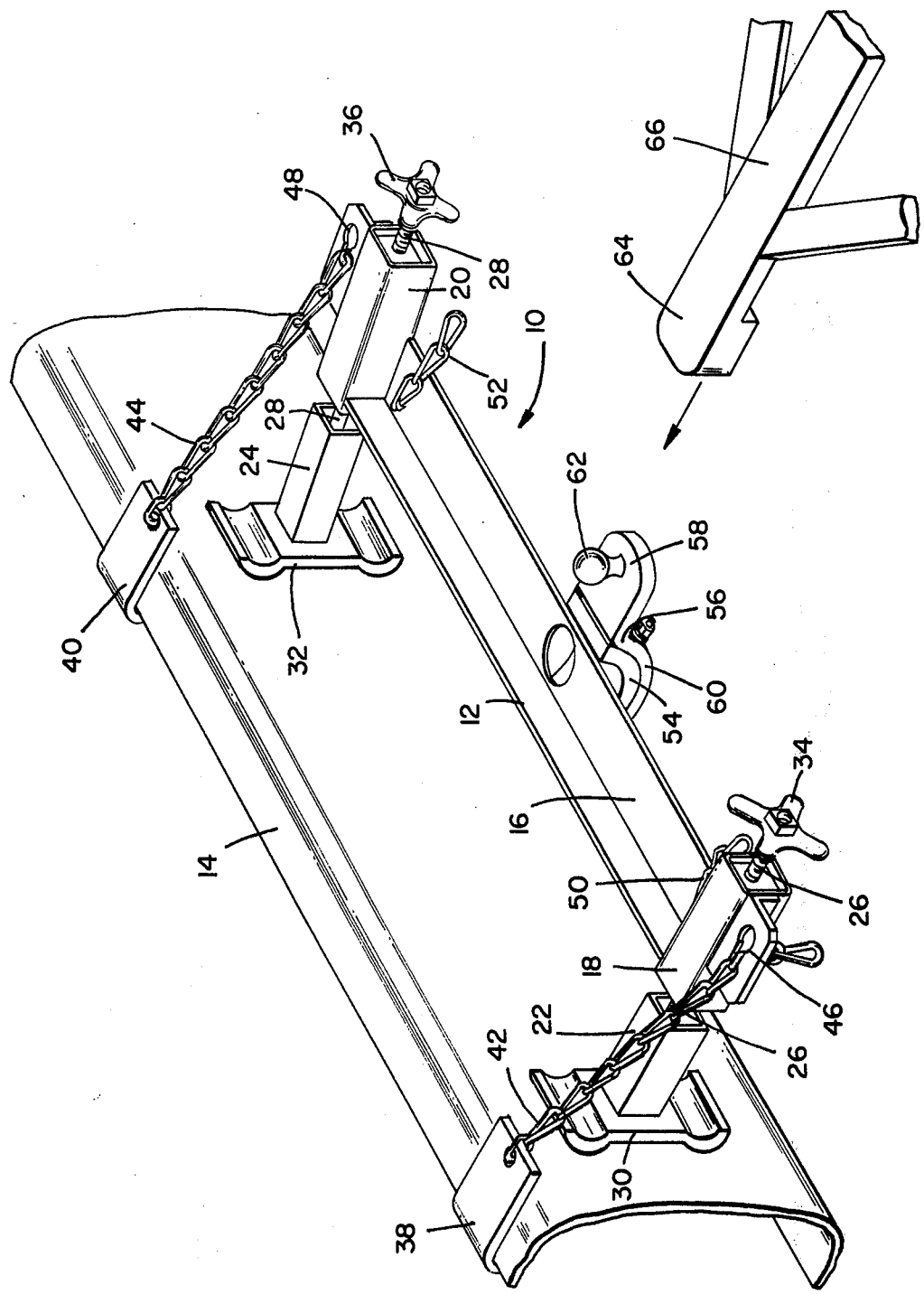
FIG_1

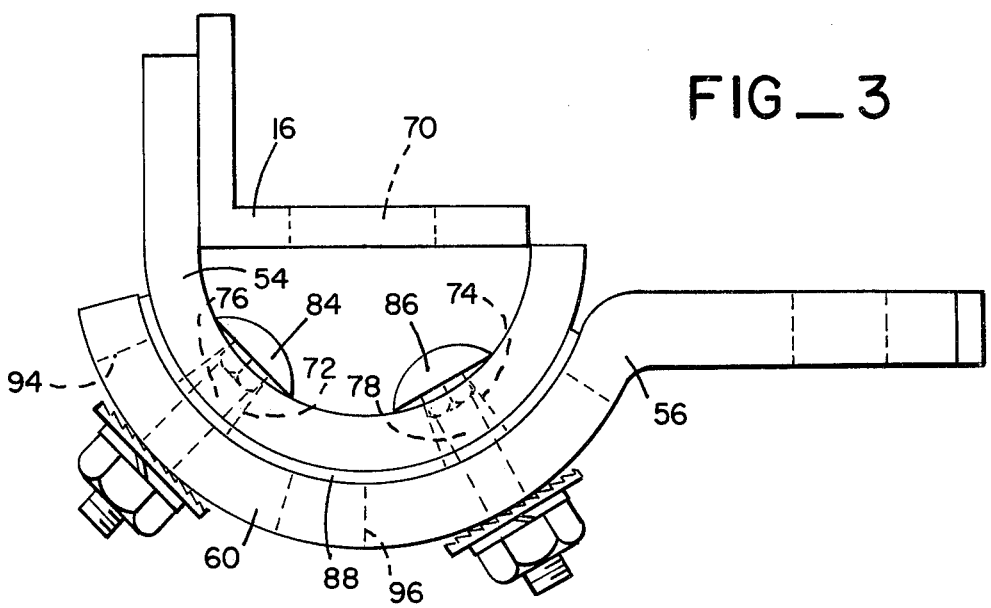
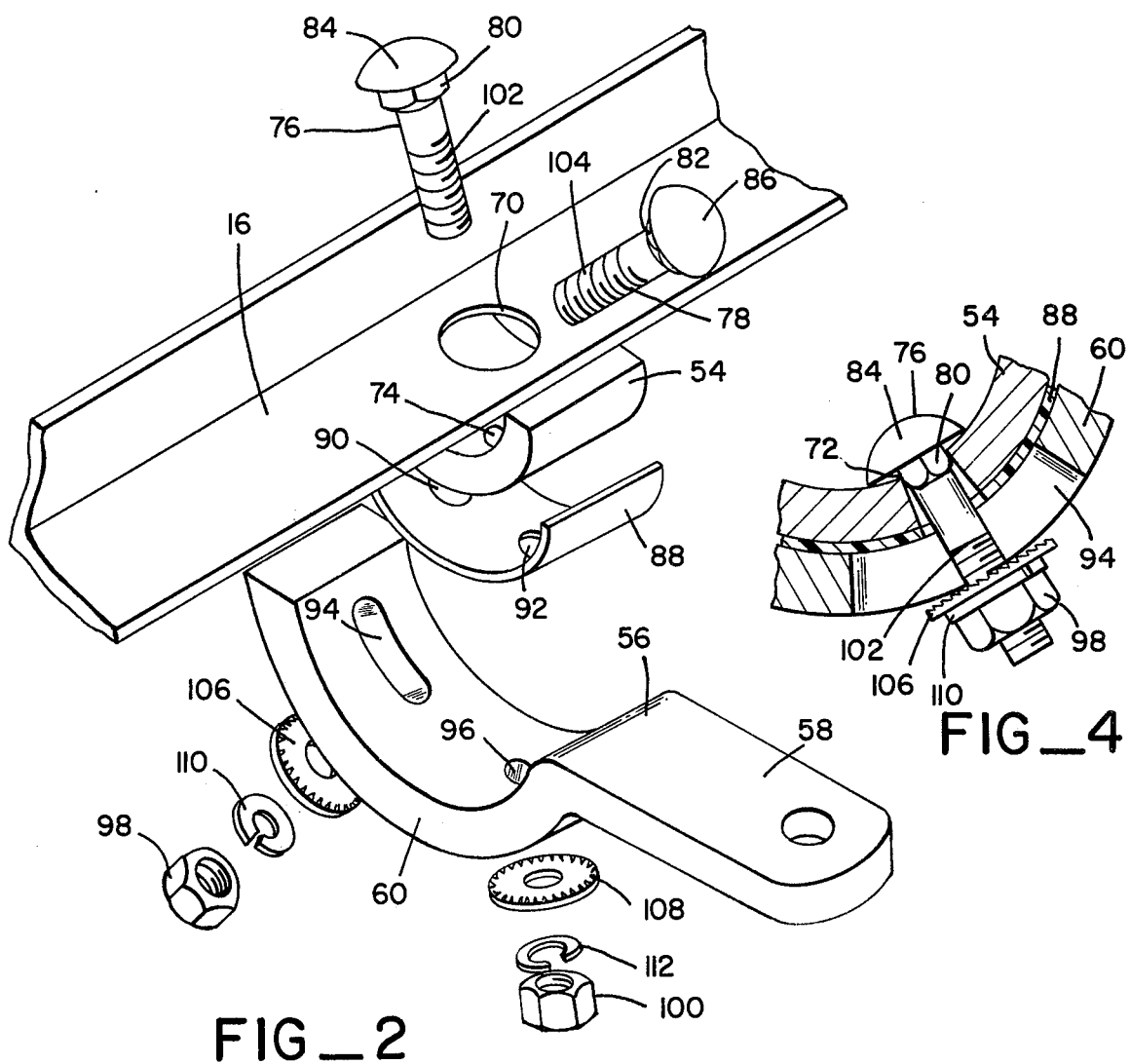

ADJUSTABLE DRAWBAR

BACKGROUND OF THE INVENTION

The present invention relates to trailer hitches, and in particular, to an adjustable drawbar forming part of such a trailer hitch.

In mounting a trailer hitch to a towing vehicle, it is important to insure that the drawbar portion of the hitch is horizontal in order that unwanted stresses are not imposed on the drawbar. These stresses can cause failure of the hitch or result in damage to the towing vehicle. If a trailer hitch is to be permanently mounted to a towing vehicle, such as by welding the hitch to the frame of that vehicle, care can be taken in the installation of the hitch to insure that the drawbar is horizontal. However, when a trailer hitch is to be temporarily mounted to a towing vehicle, as is often the practice when trailers are rented, insuring that the drawbar is horizontal is far more difficult. Such temporary trailer hitches are designed to accommodate a wide variety of different vehicles, and usually cannot be mounted with sufficient precision so that the drawbar is horizontal. As a result, when a trailer is pulled using such a temporary trailer hitch, undue stresses are often exerted on the drawbar which can cause it to fail, or cause damage to the towing vehicle.

SUMMARY OF THE INVENTION

The present invention provides a trailer hitch having a hitch frame which is attachable to a towing vehicle. The hitch frame includes an exposed arcuate mounting surface preferably on the underside of the frame. A drawbar is provided which has an arcuate portion contiguous to a linear trailer mounting portion. The arcuate portion has an inner arcuate surface conformed to the exposed arcuate mounting surface of the hitch frame and partially circumscribes the mounting surface. Apparatus are provided for mounting the arcuate portion of the drawbar to the mounting surface of the hitch frame allowing for circumferential adjustment of the drawbar with respect to the mounting surface.

The present invention allows for the adjustment of the position of a drawbar after the hitch frame has been mounted to the towing vehicle so that the trailer mounting portion thereof can be made horizontal. In this manner the likelihood of damage to the trailer hitch or the towing vehicle due to the misalignment of the drawbar is minimized.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a trailer hitch embodying the present invention;

FIG. 2 is an exploded view of the drawbar arrangement of the present invention;

FIG. 3 is a side elevation view of the drawbar arrangement of the present invention;

FIG. 4 is a fragmentary view illustrating the attachment of the drawbar of the present invention to the hitch frame.

DESCRIPTION OF THE PREFERRED EMEBODIMENT

A trailer hitch 10 embodying the apparatus of the present invention is illustrated by way of reference to FIG. 1. Hitch 10 includes a hitch frame 12 attached to the bumper 14 of a towing vehicle. Hitch frame 12 includes a transverse beam 16 having box members 18, 20 at each end. Second box members 22, 24 are connected to box members 18, 20 by means of threaded members 26, 28. Bumper pads 30, 32 are fixed to the leading ends of box members 22, 24 and are adapted to abut bumper 14.

When hitch frame 12 is to be mounted to bumper 14, pads 30, 32 are fully retracted by rotating star nuts 34, 36 at the exposed ends of threaded members 26, 28 counter-clockwise. After full retraction of pads 30, 32, hooks 38, 40 are engaged with the upper edge of bumper 14. Chains 42, 44, connected to hooks 38, 40, are drawn through slots 46, 48 and locked therein so that hitch frame 12 is suspended from bumper 14. Similar hooks (not visible) are then engaged with the lower edge of bumper 14 and fixed in position by chains 50, 52. After hitch frame 12 is thus attached to the bumper 14 of the towing vehicle star nuts 34, 36 are rotated clockwise to take the slack out of the chains and rigidly fix the hitch frame to the towing vehicle.

The hitch frame 16 illustrated in FIG. 1 can easily be adapted to a wide variety of towing vehicles and provides a hitch frame which can conveniently be attached and detached from that vehicle. Such a versatile hitch frame is often used by rental agencies, and is rented along with a trailer. However, the difficulty with this hitch frame and other such temproary hitch frames is that the orientation of the hitch frame with respect to the towing vehicle is not precise. The primary danger with this lack of precision is that the drawbar of the hitch is not horizontal, creating unanticipated stresses or bending moments in the drawbar. These stresses can cause the hitch to fail and the bending moments imposed may cause damage to the towing vehicle. In order to prevent such problems, the present invention provides an arcuate member 54 located at the underside of hitch frame 12. A drawbar 56 is provided which has a linear trailer mounting portion 58 contiguous to an arcuate portion 60. Arcuate portion 60 of drawbar 56 partially circumscribes the exposed outer surface of arcuate member 54 and is circumferentially adjustable with respect thereto in order that trailer mounting portion 58 can be made horizontal and unanticipated stresses will not be imposed on the hitch bar.

A standard trailer hitching mechanism such as hitch ball 62 is ordinarily fixed to trailer mounting portion 58 for attachment of the leading end 64 of trailer tongue 66 thereto. Other customary hitching mechanisms could be used as well with the apparatus of the present invention.

The adjustable drawbar of the present invention is illustrated in more detail by way of reference to FIGS. 2–4. Arcuate member 54 is mounted to the underside of transverse member 16 beneath an access hole 70 in the transverse member. A pair of apertures 72, 74 are formed in arcuate member 54, each aperture having a rectangular cross section at least at the upper end. A pair of carriage bolts 76, 78 having rectangular portions 80, 82 immediately beneath the head portions 84, 86 mate with apertures 72, 74 to prevent rotation of the bolts. A pad 88 is disposed underneath the exterior mounting surface of arcuate member 54, and has apertures 90, 92 corresponding to apertures 72, 74 in the arcuate member to allow for passage of bolts 76, 78 therethrough. The arcuate portion 60 of drawbar 56 partially circumscribes the mounting surface of arcuate member 54, and has a pair of circumferentially elongate slots 94, 96 adapted to overlie slots 72, 74 in arcuate member 54.

After the hitch frame has been rigidly attached to the bumper of the towing vehcile, the nuts 98, 100 normally engaged with the threaded portions 102, 104 of carriage bolts 76, 78 are loosened. This allows drawbar 56 to be circumferentially adjusted so that trailer mounting portion 58 can be made horizontal. After such adjustment, nuts 98, 100 are tightened, thus biasing washers 106, 108 and lock nuts 110, 112 against the underside of drawbar 56. Washers 106, 108 are ribbed to compensate for the curvature and prevent slippage of the underside of drawbar 56 and lock nuts 110, 112 reduce the likelihood of nuts 98, 100 becoming loosened. Thus, drawbar 56 can be easily adjusted with respect to the hitch frame once it has been attached to the vehicle so the trailer can be safely towed.

While a preferred embodiment of the present invention has been illustrated in detail, it is apparent that modifications and adaptations of that embodiment will occur to those skilled in the art. For example, it is apparent that the apparatus of the present invention can be used with a wide variety of hitch frames and can even be used with frames adapted to be permanently mounted to the towing vehicle. However, it is to be expressly understood that such modifications and adaptations are within the scope of the present invention, as set forth in the following claims.

What I claim as new is:

1. A trailer hitch comprising:
   a hitch frame attachable to a towing vehicle and including an exposed arcuate mounting surface having at least one aperture formed therethrough;
   a drawbar having an arcuate portion and a linear trailer mounting portion contiguous to the arcuate portion, said arcuate portion having an inner arcuate surface conformed to the exposed arcuate mounting surface of the hitch frame and adapted to partially circumscribe said mounting surface, and at least one circumferential slot through said arcuate portion; and
   means for mounting the arcuate portion of the drawbar to the mounting surface of the hitch frame, said mounting means including at least one fastener extending through the aperture in the mounting surface and the slot in the arcuate portion of the drawbar, said fastener being loosened for adjusting the circumferential position of the arcuate portion of the drawbar with respect to the mounting surface so that the trailer mounting portion of the drawbar can be made horizontal and tightened to fix the drawbar in position so that the likelihood of damage to the trailer hitch or the towing vehicle due to misalignment of the drawbar is minimized.

2. A trailer hitch as recited in claim 1 and additionally comprising a pad intermediate the exposed arcuate mounting surface of the hitch frame and the arcuate portion of the drawbar.

3. A trailer hitch as recited in claim 1 wherein the hitch frame includes an arcuate member rigidly fixed to the underside of the frame, the outer surface of said arcuate member providing the exposed arcuate mounting surface.

4. A trailer hitch as recited in claim 1 wherein the mounting surface of the hitch frame includes a pair of apertures, wherein the drawbar includes a pair of circumferential slots formed in the arcuate portion thereof, and wherein the mounting means includes a pair of bolts extending through the apertures in the hitch frame and the respective slots in the drawbar to allow for circumferential movement of the drawbar with respect to a hitch frame and a pair of nuts threadably engageable with the bolts to fix the position of the drawbar with respect to the hitch frame.

5. A trailer hitch as recited in claim 1 and additionally comprising a hitch ball mountable to the trailer mounting portion of the drawbar for attachment of a trailer thereto.

6. A trailer hitch comprising:
   a hitch frame attachable to a towing vehicle and including an arcuate member at the underside of said frame, the outer surface of said arcuate member providing an exposed arcuate mounting surface, said arcuate member having at least one aperture formed therethrough;
   a drawbar having an arcuate portion and a linear trailer mounting portion contiguous to the arcuate portion, said arcuate portion having an inner arcuate surface conformed to the exposed arcuate mounting surface of the hitch frame and adapted to partially circumscribe said mounting surface, said arcuate portion further having at least one circumferential slot formed therein and adapted to overlie the aperture in the arcuate member of the hitch frame;
   a pad intermediate the exposed arcuate mounting surface of the hitch frame and the arcuate portion of the drawbar;
   a bolt adapted to extend through the aperture in the arcuate member of the hitch frame and the slot in the drawbar to allow for limited circumferential movement of the drawbar with respect to the hitch frame so that the trailer mounting portion of the drawbar can be made horizontal; and
   a nut threadably engageable with the bolt to fix the position of the drawbar with respect to the hitch frame after the trailer mounting portion thereof has been made horizontal.

\* \* \* \* \*